US010860334B2

United States Patent
Li

(10) Patent No.: US 10,860,334 B2
(45) Date of Patent: Dec. 8, 2020

(54) SYSTEM AND METHOD FOR CENTRALIZED BOOT STORAGE IN AN ACCESS SWITCH SHARED BY MULTIPLE SERVERS

(71) Applicant: Alibaba Group Holding Limited, George Town (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 260 days.

(21) Appl. No.: 15/793,702

(22) Filed: Oct. 25, 2017

(65) Prior Publication Data

US 2019/0121648 A1  Apr. 25, 2019

(51) Int. Cl.
G06F 9/44 (2018.01)
G06F 9/4401 (2018.01)
G06F 3/06 (2006.01)
G06F 8/61 (2018.01)

(52) U.S. Cl.
CPC ............ *G06F 9/4416* (2013.01); *G06F 3/061* (2013.01); *G06F 3/0608* (2013.01); *G06F 3/0626* (2013.01); *G06F 3/0655* (2013.01); *G06F 3/0673* (2013.01); *G06F 8/63* (2013.01)

(58) Field of Classification Search
USPC ......................................................... 709/222
See application file for complete search history.

(56) References Cited

U.S. PATENT DOCUMENTS 4,775,932 A 10/1988 Oxley
6,148,377 A 11/2000 Carter
6,226,650 B1 5/2001 Mahajan et al.
7,565,454 B2 7/2009 Zuberi
8,260,924 B2 9/2012 Koretz
8,452,819 B1 5/2013 Sorenson, III
8,516,284 B2 8/2013 Chan
8,751,763 B1 6/2014 Ramarao
(Continued)

FOREIGN PATENT DOCUMENTS

JP 2003022209 1/2003
JP 2011175422 9/2011
(Continued)

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

(Continued)

*Primary Examiner* — James A Edwards
(74) *Attorney, Agent, or Firm* — Shun Yao; Park, Vaughan, Fleming & Dowler LLP

(57) ABSTRACT

One embodiment of the present invention provides a system for centralized boot storage. The system comprises a first switch, which comprises a non-volatile memory and a communication module. The non-volatile memory is configured to store an image of an operating system for booting up one or more servers in a rack. The communication module is configured to: receive a first request for the image from a first server; and in response to the first request, transmit the image to the first server, thereby allowing the first server to boot up based on the image.

20 Claims, 11 Drawing Sheets

(56) References Cited

U.S. PATENT DOCUMENTS

| | | | |
|---|---|---|---|
| 8,825,937 B2 | 9/2014 | Atkisson | |
| 9,043,545 B2 | 5/2015 | Kimmel | |
| 9,088,300 B1 | 7/2015 | Chen | |
| 9,092,223 B1 | 7/2015 | Pani | |
| 9,280,472 B1 | 3/2016 | Dang | |
| 9,280,487 B2 | 3/2016 | Candelaria | |
| 9,529,601 B1* | 12/2016 | Dharmadhikari | G06F 9/4406 |
| 9,588,698 B1 | 3/2017 | Karamcheti | |
| 9,588,977 B1 | 3/2017 | Wang | |
| 10,013,169 B2 | 7/2018 | Fisher | |
| 10,235,198 B2 | 3/2019 | Qiu | |
| 2002/0010783 A1 | 1/2002 | Primak | |
| 2002/0073358 A1 | 6/2002 | Atkinson | |
| 2002/0161890 A1 | 10/2002 | Chen | |
| 2003/0163594 A1 | 8/2003 | Aasheim | |
| 2003/0163633 A1 | 8/2003 | Aasheim | |
| 2004/0010545 A1 | 1/2004 | Pandya | |
| 2004/0255171 A1 | 12/2004 | Zimmer | |
| 2004/0268278 A1 | 12/2004 | Hoberman | |
| 2005/0038954 A1 | 2/2005 | Saliba | |
| 2005/0097126 A1 | 5/2005 | Cabrera | |
| 2005/0177755 A1 | 8/2005 | Fung | |
| 2005/0195635 A1 | 9/2005 | Conley | |
| 2005/0235067 A1 | 10/2005 | Creta | |
| 2005/0235171 A1 | 10/2005 | Igari | |
| 2006/0156012 A1 | 7/2006 | Beeson | |
| 2007/0033323 A1 | 2/2007 | Gorobets | |
| 2007/0101096 A1 | 5/2007 | Gorobets | |
| 2008/0034154 A1 | 2/2008 | Lee | |
| 2009/0113219 A1 | 4/2009 | Aharonov | |
| 2009/0282275 A1 | 11/2009 | Yermalayeu | |
| 2009/0307249 A1 | 12/2009 | Koifman | |
| 2009/0310412 A1 | 12/2009 | Jang | |
| 2010/0169470 A1* | 7/2010 | Takashige | G06F 8/63 709/223 |
| 2010/0229224 A1 | 9/2010 | Etchegoyen | |
| 2010/0325367 A1 | 12/2010 | Kornegay | |
| 2011/0055458 A1 | 3/2011 | Kuehne | |
| 2011/0055471 A1 | 3/2011 | Thatcher | |
| 2011/0099418 A1 | 4/2011 | Chen | |
| 2011/0153903 A1 | 6/2011 | Hinkle | |
| 2011/0161784 A1 | 6/2011 | Selinger | |
| 2011/0218969 A1 | 9/2011 | Anglin | |
| 2011/0231598 A1 | 9/2011 | Hatsuda | |
| 2011/0292538 A1 | 12/2011 | Haga | |
| 2011/0302353 A1 | 12/2011 | Confalonieri | |
| 2012/0084523 A1 | 4/2012 | Littlefield | |
| 2012/0117399 A1 | 5/2012 | Chan | |
| 2012/0147021 A1 | 6/2012 | Cheng | |
| 2012/0159289 A1 | 6/2012 | Piccirillo | |
| 2012/0210095 A1 | 8/2012 | Nellans | |
| 2012/0246392 A1 | 9/2012 | Cheon | |
| 2012/0278579 A1 | 11/2012 | Goss | |
| 2012/0284587 A1 | 11/2012 | Yu | |
| 2013/0061029 A1* | 3/2013 | Huff | G06F 9/24 713/2 |
| 2013/0073798 A1 | 3/2013 | Kang | |
| 2013/0080391 A1 | 3/2013 | Raichstein | |
| 2013/0145085 A1 | 6/2013 | Yu | |
| 2013/0145089 A1 | 6/2013 | Eleftheriou | |
| 2013/0151759 A1 | 6/2013 | Shim | |
| 2013/0159251 A1 | 6/2013 | Skrenta | |
| 2013/0166820 A1 | 6/2013 | Batwara | |
| 2013/0173845 A1 | 7/2013 | Aslam | |
| 2013/0219131 A1 | 8/2013 | Alexandron | |
| 2013/0318283 A1 | 11/2013 | Small | |
| 2014/0082273 A1 | 3/2014 | Segev | |
| 2014/0108414 A1 | 4/2014 | Stillerman | |
| 2014/0181532 A1 | 6/2014 | Camp | |
| 2014/0233950 A1 | 8/2014 | Luo | |
| 2014/0250259 A1 | 9/2014 | Ke | |
| 2014/0304452 A1 | 10/2014 | De La Iglesia | |
| 2014/0310574 A1 | 10/2014 | Yu | |
| 2014/0359229 A1 | 12/2014 | Cota-Robles | |
| 2014/0365707 A1 | 12/2014 | Talagala | |
| 2015/0019798 A1 | 1/2015 | Huang | |
| 2015/0082317 A1 | 3/2015 | You | |
| 2015/0106556 A1 | 4/2015 | Yu | |
| 2015/0106559 A1 | 4/2015 | Cho | |
| 2015/0142752 A1 | 5/2015 | Chennamsetty | |
| 2015/0227316 A1 | 8/2015 | Warfield | |
| 2015/0277937 A1* | 10/2015 | Swanson | G06F 9/4416 713/2 |
| 2015/0301964 A1 | 10/2015 | Brinicombe | |
| 2015/0304108 A1 | 10/2015 | Obukhov | |
| 2015/0363271 A1 | 12/2015 | Haustein | |
| 2015/0372597 A1 | 12/2015 | Luo | |
| 2016/0014039 A1* | 1/2016 | Reddy | H04L 67/38 709/224 |
| 2016/0098344 A1 | 4/2016 | Gorobets | |
| 2016/0110254 A1 | 4/2016 | Cronie | |
| 2016/0203000 A1* | 7/2016 | Parmar | G06F 9/4416 713/2 |
| 2016/0232103 A1 | 8/2016 | Schmisseur | |
| 2016/0239074 A1 | 8/2016 | Lee | |
| 2016/0239380 A1 | 8/2016 | Wideman | |
| 2016/0274636 A1* | 9/2016 | Kim | G06F 1/26 |
| 2016/0306853 A1 | 10/2016 | Sabaa | |
| 2016/0343429 A1 | 11/2016 | Nieuwejaar | |
| 2016/0350002 A1 | 12/2016 | Vergis | |
| 2016/0350385 A1* | 12/2016 | Poder | H04L 67/1097 |
| 2017/0075583 A1 | 3/2017 | Alexander | |
| 2017/0075594 A1 | 3/2017 | Badam | |
| 2017/0109232 A1 | 4/2017 | Cha | |
| 2017/0147499 A1 | 5/2017 | Mohan | |
| 2017/0162235 A1 | 6/2017 | De | |
| 2017/0168986 A1 | 6/2017 | Sajeepa | |
| 2017/0212708 A1 | 7/2017 | Suhas | |
| 2017/0228157 A1 | 8/2017 | Yang | |
| 2017/0249162 A1 | 8/2017 | Tsirkin | |
| 2017/0262178 A1 | 9/2017 | Hashimoto | |
| 2017/0285976 A1 | 10/2017 | Durham | |
| 2017/0286311 A1 | 10/2017 | Juenemann | |
| 2017/0344470 A1 | 11/2017 | Yang | |
| 2017/0344491 A1 | 11/2017 | Pandurangan | |
| 2017/0353576 A1 | 12/2017 | Guim Bernat | |
| 2018/0024772 A1 | 1/2018 | Madraswala | |
| 2018/0088867 A1 | 3/2018 | Kaminaga | |
| 2018/0107591 A1 | 4/2018 | Smith | |
| 2018/0143780 A1 | 5/2018 | Cho | |
| 2018/0167268 A1* | 6/2018 | Liguori | H04L 67/2814 |
| 2018/0189182 A1 | 7/2018 | Wang | |
| 2018/0212951 A1* | 7/2018 | Goodrum | H04L 63/0428 |
| 2018/0270110 A1* | 9/2018 | Chugtu | H04L 41/0803 |
| 2018/0329776 A1 | 11/2018 | Lai | |
| 2018/0373428 A1 | 12/2018 | Kan | |
| 2019/0012111 A1 | 1/2019 | Li | |
| 2019/0073262 A1 | 3/2019 | Chen | |
| 2019/0205206 A1 | 7/2019 | Hornung | |

FOREIGN PATENT DOCUMENTS

| | | |
|---|---|---|
| WO | 9418634 | 8/1994 |
| WO | 1994018634 | 8/1994 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices" < FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

(56) References Cited

OTHER PUBLICATIONS

Helen H. W. Chan et al. "HashKV: Enabling Efficient Updated in KV Storage via Hashing", https://www.usenix.org/conference/atc18/presentation/chan, (Year: 2018).

* cited by examiner

US 10,860,334 B2

SYSTEM AND METHOD FOR CENTRALIZED BOOT STORAGE IN AN ACCESS SWITCH SHARED BY MULTIPLE SERVERS

BACKGROUND

Field

This disclosure is generally related to the field of data storage. More specifically, this disclosure is related to a system and method for centralized boot storage in an access switch shared by multiple servers.

Related Art

The proliferation of the Internet and e-commerce continues to create a vast amount and types of digital content. Data center storage systems have been created to store such digital content. A traditional data center may include multiple racks, where each rack includes multiple servers. Each server may include a local boot drive and multiple data storage drives. The local boot drive is a read-only drive which serves as the operating system (OS) drive, and is used to boot up a server. To maintain uniformity in a rack, the local boot drive in each server is configured with the same OS image (i.e., the same image is duplicated multiple times in one rack). The data storage drives are used to read and write data. Because the boot drive is read-only, it has a lower capacity and a lower performance than a data storage drive. A storage drive (e.g., NAND flash) has a higher capacity than a boot drive, such that a single NAND die may have a higher capacity than one boot drive. This discrepancy may create challenges in both supply and maintenance for the servers in the rack. Furthermore, the multiple copies of the same OS image duplicated in each server can decrease the efficiency of the system, and can affect the associated maintenance and operation costs for a rack, which may increase the total cost of ownership (TCO).

SUMMARY

One embodiment provides a system which facilitates centralized boot storage. The system comprises a first switch, which comprises a non-volatile memory and a communication module. The non-volatile memory is configured to store an image of an operating system for booting up one or more servers in a rack. The communication module is configured to: receive a first request for the image from a first server; and in response to the first request, transmit the image to the first server, thereby allowing the first server to boot up based on the image.

In some embodiments, a respective server in the rack does not store the image and does not include any non-volatile memory.

In some embodiments, the non-volatile memory is one or more of: a byte-addressable memory; and a NOR flash memory.

In some embodiments, the first switch is an active switch. Responsive to the communication module of the first switch failing to transmit the image to the first server, the first request is sent to a communication module of a standby device for the first switch, wherein the standby device comprises a non-volatile memory configured to store the image. The communication module of the standby device is configured to receive the first request and transmit the image to the first server.

In some embodiments, the standby device is a second switch in the rack or in another rack.

In some embodiments, the standby device is a second server in the rack or in another rack.

In some embodiments, the non-volatile memory is further configured to store a duplicate image of the operating system, wherein the duplicate image is used to provide high availability for the rack.

In some embodiments, the communication module is further configured to: receive the first request from the first server based on a converged Ethernet protocol; receive, from the first server based on the converged Ethernet protocol, a second request to perform an I/O operation on data associated with an aggregated storage device in the rack, wherein the aggregated storage device stores data for the servers in the rack; and in response to receiving the second request, transmit the second request to the aggregated storage device, thereby allowing the aggregated storage device to perform the I/O operation.

In some embodiments, the aggregated storage device comprises: a plurality of high-speed network interface cards which communicate with the first switch based on the converged Ethernet protocol; a plurality of storage drives with non-volatile memory; and a central processing unit which communicates with the storage drives based on a peripheral component interconnect express protocol.

In some embodiments, the communication module is further configured to: transmit, to the aggregated storage device based on the converged Ethernet protocol, a file with log information relating to the operating system. The aggregated storage device further comprises a communication module configured to: receive the log file; and store the log file in a non-volatile memory of the aggregated storage device.

Another embodiment provides a system which facilitates centralized boot storage. The system receives, by a first server of one or more servers in a rack, a request to boot up the first server. The first server obtains, based on configuration information associated with the boot request, an IP address of a first device which stores an image of an operating system for booting up the servers in the rack, wherein the first device is a switch which resides in the rack or another rack. In response to successfully establishing a secure connection with the first device and receiving the image, the first server performs an installation based on the image.

In some embodiments, in response to unsuccessfully establishing a secure connection with the first device, the system performs the following operations: the system generates a message indicating an unsuccessful connection with the first device, thereby allowing an operator of a data center associated with the first device to investigate the unsuccessful connection with the first device; the system obtains, based on the configuration information, an IP address of a second device which stores the image, wherein the second device is a switch or a server which resides in the rack or another rack; in response to successfully establishing a secure connection with the second device and receiving the image, the first server performs an installation based on the image; and in response to unsuccessfully establishing a secure connection with the second device, the system generates a message indicating an unsuccessful connection with the second device, thereby allowing the operator to investigate the unsuccessful connection with the second device.

BRIEF DESCRIPTION OF THE FIGURES

In the figures, like reference numerals refer to the same figure elements.

DETAILED DESCRIPTION

Figure 1:
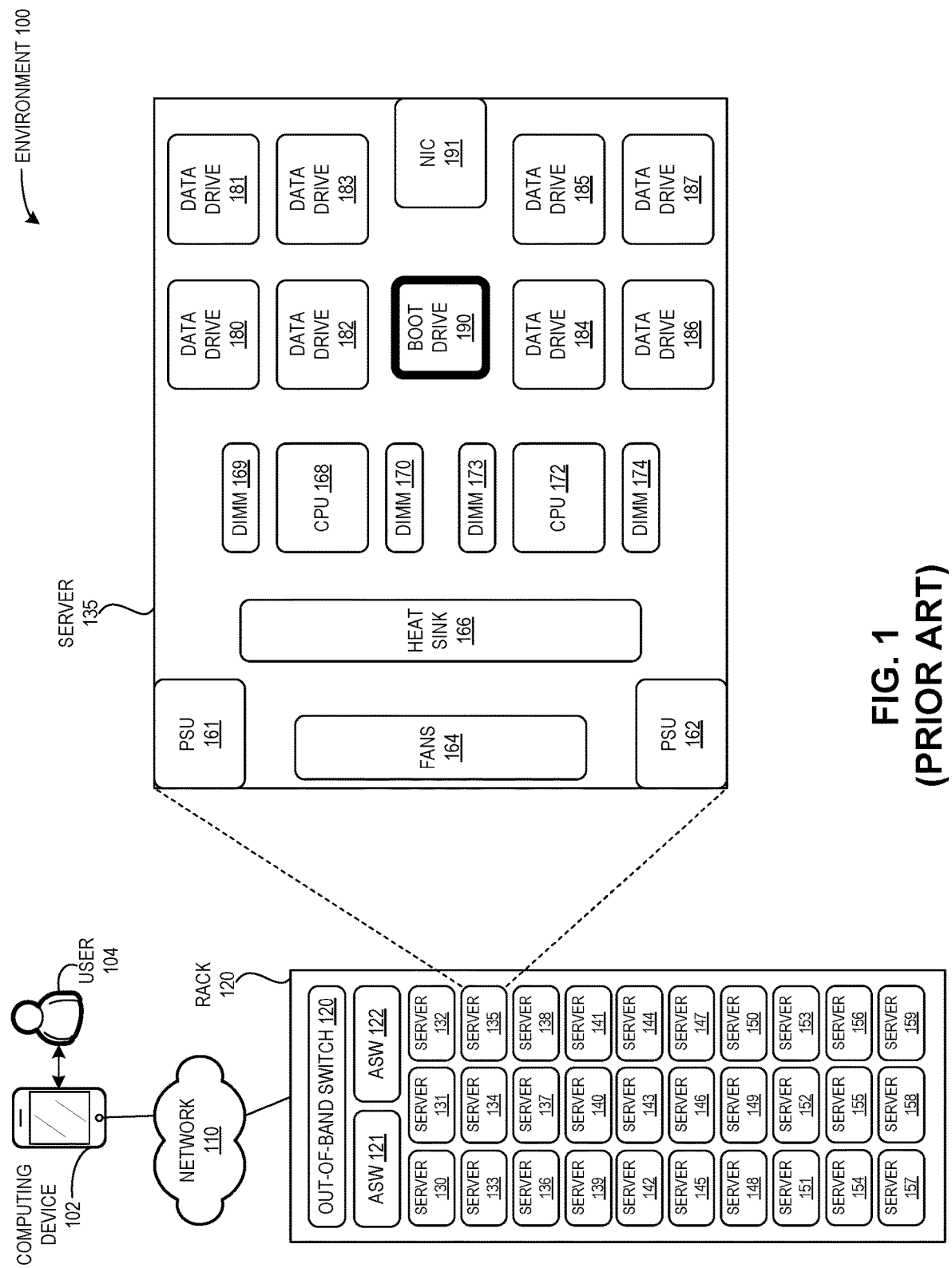
FIG. 1 illustrates an exemplary environment, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein address the inefficiencies associated with including a duplicate OS drive across multiple servers in a rack by providing a system which centralizes the boot storage in a switch which resides on the rack. A traditional data center may include multiple racks, where each rack includes multiple servers. Each server may include a local boot drive and multiple data storage drives. The local boot drive is a read-only drive which serves as the operating system (OS) drive, and is used to boot up a server. To maintain uniformity in a rack, the local boot drive in each server is configured with the same OS image (i.e., the same image is duplicated multiple times in one rack). The data storage drives are used to read and write data. Because the boot drive is read-only, it has a lower capacity and a lower performance than a data storage drive. A storage drive (e.g., NAND flash) has a higher capacity than a boot drive, such that a single NAND die may have a higher capacity than one boot drive. This discrepancy may create challenges in both supply and maintenance for the servers in the rack. Furthermore, the multiple copies of the same OS image duplicated in each server can decrease the efficiency of the system, and can affect the associated maintenance and operation costs for a rack, which may increase the total cost of ownership (TCO).

The embodiments described herein provide a system which increases the density of servers in a rack by facilitating centralized boot storage (specifically, by removing the boot drive and the data drives from each server). The system places the boot drive in a centralized location accessible to the servers, e.g., in two switches in the same or a nearby rack as the servers, where the two switches can provide high availability for each other. The system also places the data drives in an aggregated storage device on the same rack. The system further uses a single protocol (e.g., a converged Ethernet protocol) for communication between the switches, the servers, and the aggregated storage, which can avoid the latency involved with using two or more different protocols to communicate between rack components, thus increasing the efficiency of the system. The system also removes the fans and power supply units from each server, and places a consolidated fan and power supply on the rack to be shared by all components in the rack. By decreasing the number of components residing on each server, the system can increase the density of servers in a rack, which can result in both a more efficient system and a decreased total cost of ownership (TCO).

Thus, the embodiments described herein provide a system which can improve the efficiency of a storage system, and decrease the TCO, where the improvements are fundamentally technological. The improved efficiency can include a more efficient use of storage capacity (by removing the duplicate boot drives from each server and placing them into two switches in the same rack) and an improved latency (by using the converged Ethernet protocol to access both the single, centrally stored OS image as well as data to be manipulated on the aggregated storage device). The system provides a technological solution (i.e., consolidating the boot drive into a shared high-availability architecture such as two access switches, and using a single converged Ethernet protocol and a high-capacity aggregated storage device to store data in consolidated data drives) to the technological problem of reducing latency and improving the overall efficiency of the system.

The term "data center" refers to a logical entity with one or more storage clusters.

The term "storage cluster" refers to multiple servers in multiple racks in a data center. The multiple servers may communicate with each other via the Ethernet, e.g., via a converged Ethernet protocol.

The term "rack" refers to an entity or a unit in a data center. A rack can include multiple servers or components.

The term "access switch" refers to a switch which communicates with other components in a rack. In the embodiments described herein, an "access switch with an OS drive" refers to a switch which includes a non-volatile memory configured to store an image of an operating system (OS) for booting up one or more servers in a rack where the switch resides. The term "OS drive" refers to a drive which stores the OS image.

The term "aggregated storage" or "aggregated storage device" refers to a device which stores data for multiple servers in a rack. An aggregated storage device can include multiple data drives or data storage drives. The term "data drive" or "data storage drive" refers to a medium capable of storing information, including onto which data may be written for long-term persistent storage. Exemplary data drives include solid state drives (SSDs), hard disk drives (HDDs), and Peripheral Component Interconnect Express (PCIe) SSDs/HDDs.

The term "server" refers to a computing device or program which provides functionality for other devices or programs. In the embodiments described herein, a "dense server" includes a NIC and CPUs/DIMMs, but does not include any data drives. A "boot server" includes a copy of the OS image.

The term "volatile memory" refers to computer storage which can lose data quickly upon removal of the power source, such as DRAM.

The term "non-volatile memory" refers to computer storage which can retrain data upon removal of the power source, such as NAND flash and NOR flash, and memory modules in an SSD, an HDD, and a PCIe SSD/HDD.

The terms "active device" and "standby device" refer to two devices which can provide high availability to each other.

Exemplary System in the Prior Art

FIG. 1 illustrates an exemplary environment 100, in accordance with the prior art. Environment 100 can include a computing device 102 which is associated with a user 104. Computing device 102 can include, for example, a tablet, a mobile phone, an electronic reader, a laptop computer, a desktop computer, or any other computing device. Computing device 102 can communicate via a network 110 with a rack 120 in a storage system or cluster (not shown). Rack 120 can include an out-of-band switch 120 (for parallel management with an independent network), access switches 121 and 122, and servers 130-159. Server 135, for example, can include power supply units (PSUs) 161 and 162, which can be used to provide reliability for the system upon failure of one of the PSUs. Server 135 can also include fans 164 and a heat sink 166. Fans 164 can be built into sever 135 to provide cooling, and heat sink 166 can be used to help dissipate heat from high-wattage CPUs 168 and 172 (which communicate, respectively, with DIMMS 169/170 and 173/174). Server 135 can include a network interface card (NIC) 191 for connecting server 135 with access switches 121 and 122.

Furthermore, server 135 can include data drives 180-187 and a boot drive 190. Data drives 180-187 can include non-volatile memory (such as NAND flash) for persistent data storage, allowing for both read and write operations associated with a user. The number and capacity of data drives in a server can be based on an application-specific scenario. Boot drive 190 can be a read-only drive which only stores the operating system, thus reducing the wear-out rate and relaxing any endurance requirements for the drive. Boot drive 190 has a lower capacity and a lower performance than data drives 180-187. However, given the high capacity of the NAND flash on data drives 180-187, a single NAND die alone may have a higher capacity than boot drive 190. This discrepancy between the capacity of a boot drive and the capacity of a data drive in each server may create challenges associated with both supply and maintenance operations. Thus, distributing the boot drive in each server and duplicating the OS image in all of the servers in the rack may result in an inefficient system.

Exemplary System for Facilitating Centralized Boot Storage

Figure 2:
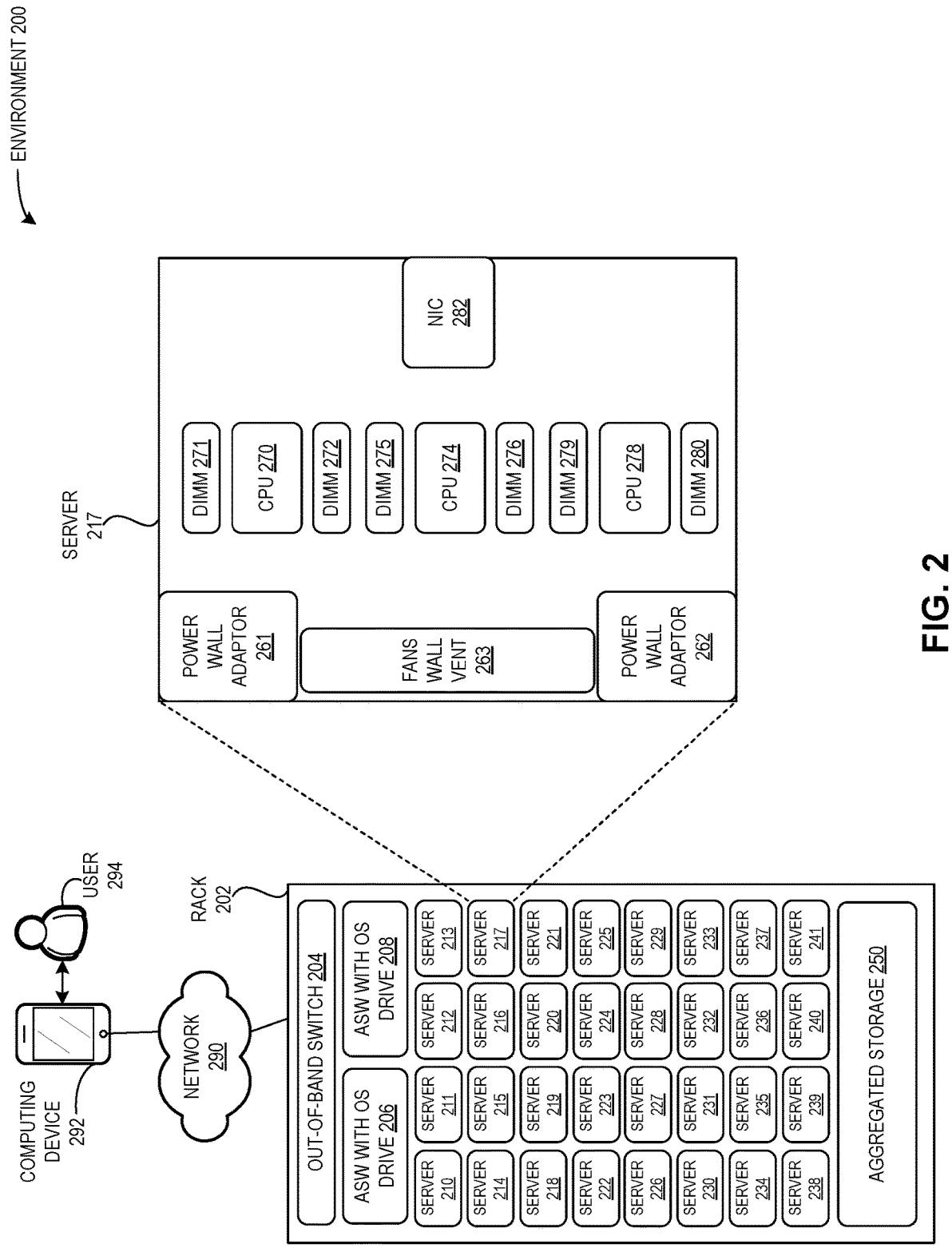
FIG. 2 illustrates an exemplary environment that facilitates centralized boot storage, in accordance with an embodiment of the present application.

FIG. 2 illustrates an exemplary environment 200 that facilitates centralized boot storage, in accordance with an embodiment of the present application. Environment 200 can include a computing device 292 which is associated with a user 294. Computing device 292 can include, for example, a tablet, a mobile phone, an electronic reader, a laptop computer, a desktop computer, or any other computing device. Computing device 292 can communicate via a network 290 with a rack 202 in a storage system or cluster (not shown). Rack 202 can include an out-of-band switch 204 and access switches 206 and 208, which can each have an OS drive (i.e., a copy of the OS image). Rack 202 can also include servers 210-241 and an aggregated storage device 250.

Rack 202 differs from rack 120 of FIG. 1 in several ways. First, in rack 202, each server can occupy less rack space because: 1) instead of including a boot drive in each server, the system places the boot drive (e.g., the OS image) in each of two access switches residing on the rack; and 2) instead of including data drives in each server, the system consolidates the data drives into an aggregated storage device. For example, in rack 202, the OS image is included in a boot drive on each of ASWs 208 and 208, and the consolidated data drives reside in aggregated storage device 250. An exemplary aggregated storage device is described below in relation to FIG. 3, and an exemplary ASW is described below in relation to FIG. 4.

Second, in rack 202, the system can consolidate the fan and the power supply to be shared by the components or modules in rack 202. Thus, each server does not need to maintain dual PSUs, and instead, only needs to include an air flow vent. For example, server 217 can include power wall adaptors 261 and 262 and a fans wall vent 263, and does not include any PSUs, fans, or heat sinks.

Third, as a result of moving the data drives to the aggregated storage in rack 202, each server can include more CPU sockets and related memory. For example, server 217 can include three CPUs 270, 274, and 278 (which communicate, respectively, with DIMMS 271/272, 275/276, and 279/280), as compared with the two CPUs and related DIMMs of server 135 of FIG. 1.

Thus, based on these differences, rack 202 can include a higher density of servers than rack 120 (i.e., servers 210-241 can be referred to as "dense" servers).

Exemplary Aggregated Storage Device

Figure 3:
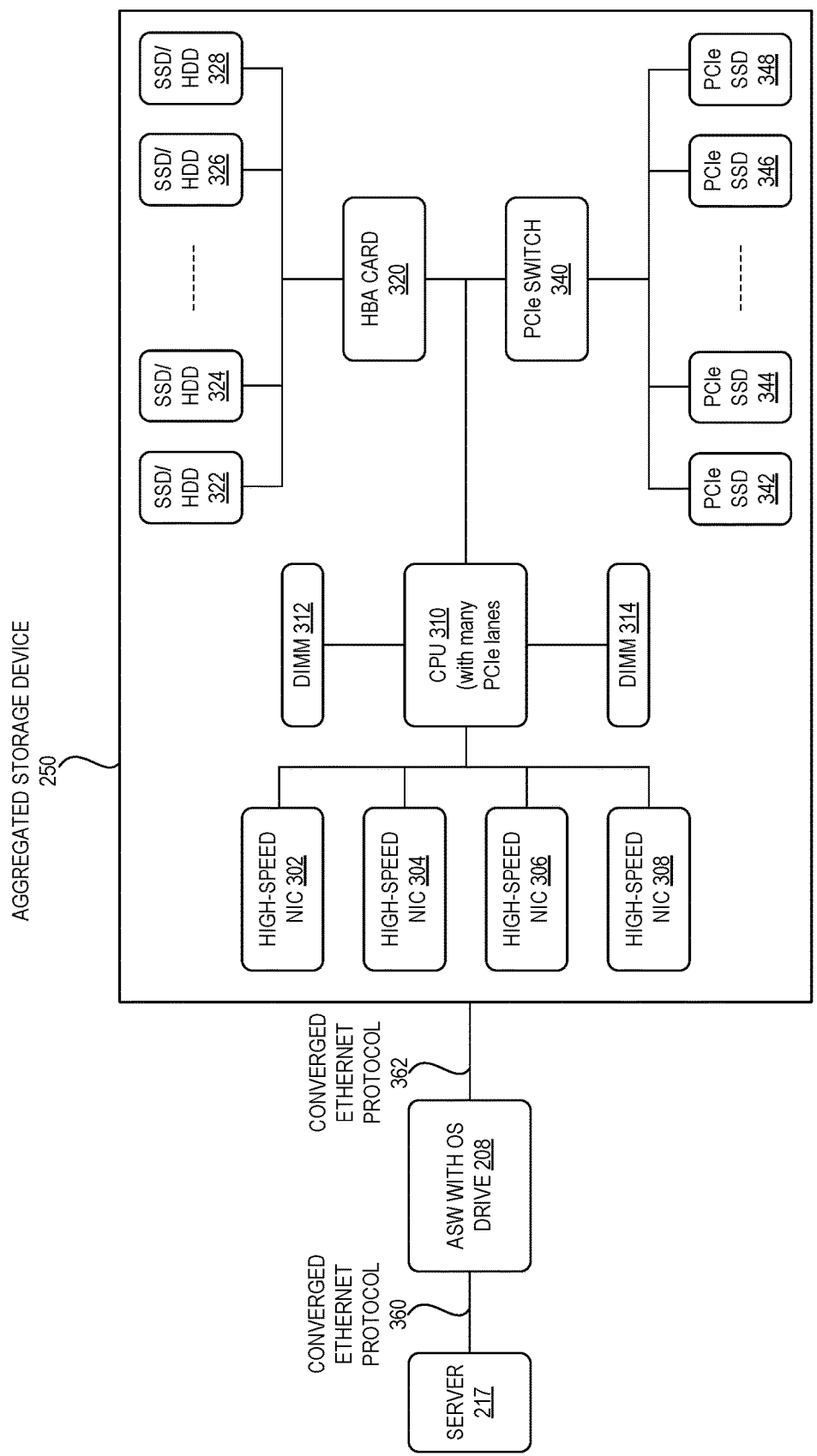
FIG. 3 illustrates an exemplary aggregated storage device, in accordance with an embodiment of the present application.

FIG. 3 illustrates exemplary aggregated storage device 250, in accordance with an embodiment of the present application. Device 250 can communicate with an ASW with OS drive 208 (depicted in FIG. 2) via a converged Ethernet protocol 362, and ASW 208 can communicate with server 217 (also depicted in FIG. 2) via a converged Ethernet protocol 360. Device 250 can include high-speed network interface cards (NICs) 302, 304, 306, and 308. These NICs can be, e.g., 100 GB cards through which device 250 communicates with ASW 208.

Device 250 can also include a central processing unit (CPU) 310 which communicates with NICs 302-308 and DIMMs 312 and 314. CPU 310 can provide as many PCIe lanes as possible, and can handle the transfer protocol exchange (e.g., Ethernet versus PCIe). For example, CPU 310 can communicate with SSD/HDDs 322, 324, 326, and 328 via an HBA card 320 based on an Ethernet protocol. CPU 310 can also communicate with PCIe SSDs 342, 344, 346, and 348 via a PCIe switch 340 based on a PCIe protocol.

Exemplary Access Switch with Boot OS Image

Figure 4:
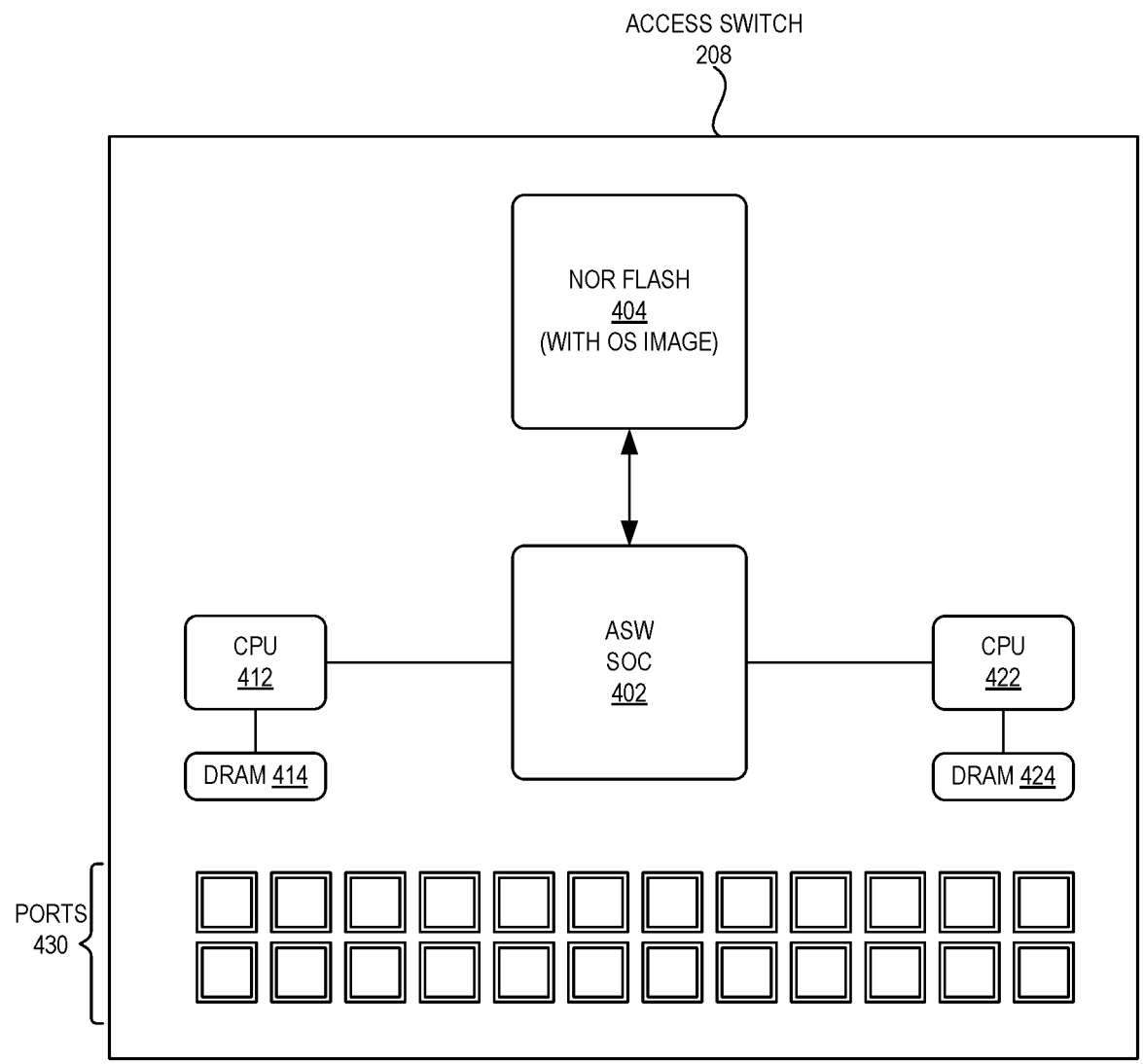
FIG. 4 illustrates an exemplary access switch, in accordance with an embodiment of the present application.

FIG. 4 illustrates exemplary access switch 208, in accordance with an embodiment of the present application. Access switch 208 can include an ASW system on chip (SOC) 402 controller, which communicates with CPUs 412 and 414 (which communicate, respectively, with DRAMs 414 and 424). The two sets of CPUs/DRAMs may be used for management purposes and to provide high availability for each other. Access switch 208 can also include ports 430.

ASW SOC 402 can communicate with a NOR flash 404, which is a non-volatile and byte-addressable memory storing the OS image. NOR flash 404 can be used as a read-only memory from which to load the OS image, thereby allowing servers in a same or a nearby rack to obtain the stored OS image and to boot up based on the OS image. ASW SOC 402 can read the contents of the boot storage (i.e., the OS image) without using a specific controller to access the NOR flash.

Exemplary Configurations for Storage of OS Image

As depicted in FIG. 2, one rack may include two ASWs which store the OS image (i.e., the NOR boot storage), where one switch is an active switch (an "active device") and the other switch is a standby switch (a "standby device"). That is, the two switches can provide high available to each other to counteract the challenges involved with having only a single point of failure. Thus, in some embodiments, the OS image may be stored in two ASW drives on the same rack, as depicted below in relation to FIG. 5A.

In other embodiments, the OS image may be stored in two servers in a rack (as depicted below in relation to FIG. 5C), or in one ASW switch and one server in a rack (as depicted below in relation to FIG. 5D). Furthermore, a requesting server may obtain the OS image from a switch or a server in the same or a different rack as the requesting server (as depicted below in relation to FIG. 5B). Thus, the active device and the standby device can be a switch or a server in the same or a different rack as the requesting server. A method by a requesting server for booting up is described below in relation to FIG. 7, and an exemplary communication between a server in one rack and a switch in another rack is described below in relation to FIG. 9.

Figure 5A:
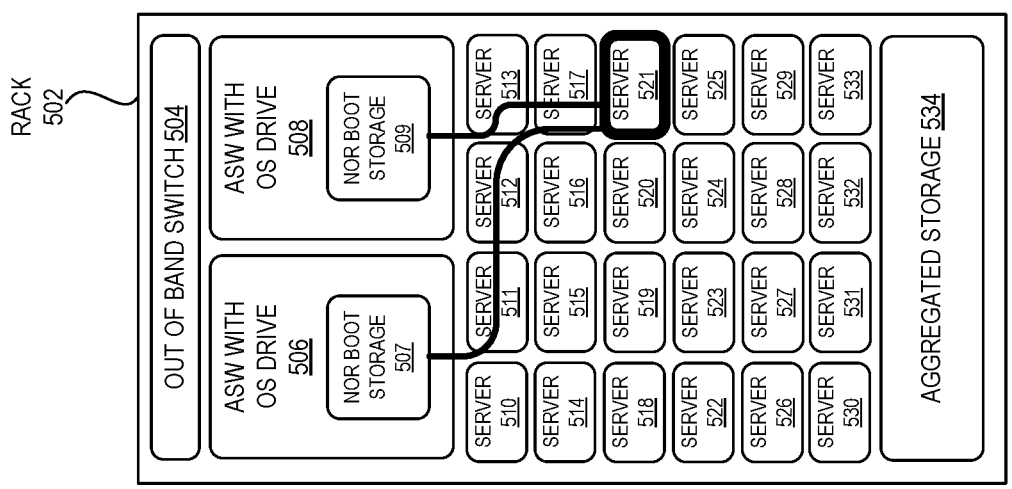
FIG. 5A illustrates an exemplary communication in a rack between a server and two switches which each include the OS image, in accordance with an embodiment of the present application.

FIG. 5A illustrates an exemplary communication in a rack 502 between a server 521 and two switches 506 and 508 which each include the OS image, in accordance with an embodiment of the present application. ASWs 506 and 508 can be configured to act as the active device and the standby device, or vice versa. For example, server 521 can request the OS image from NOR boot storage 507 of ASW 506 (acting as the active device). If server 521 is unsuccessful in obtaining the OS image from ASW 506, server 521 can request the OS image from NOR boot storage 509 of ASW 508 (acting as the standby device).

Figure 5B:
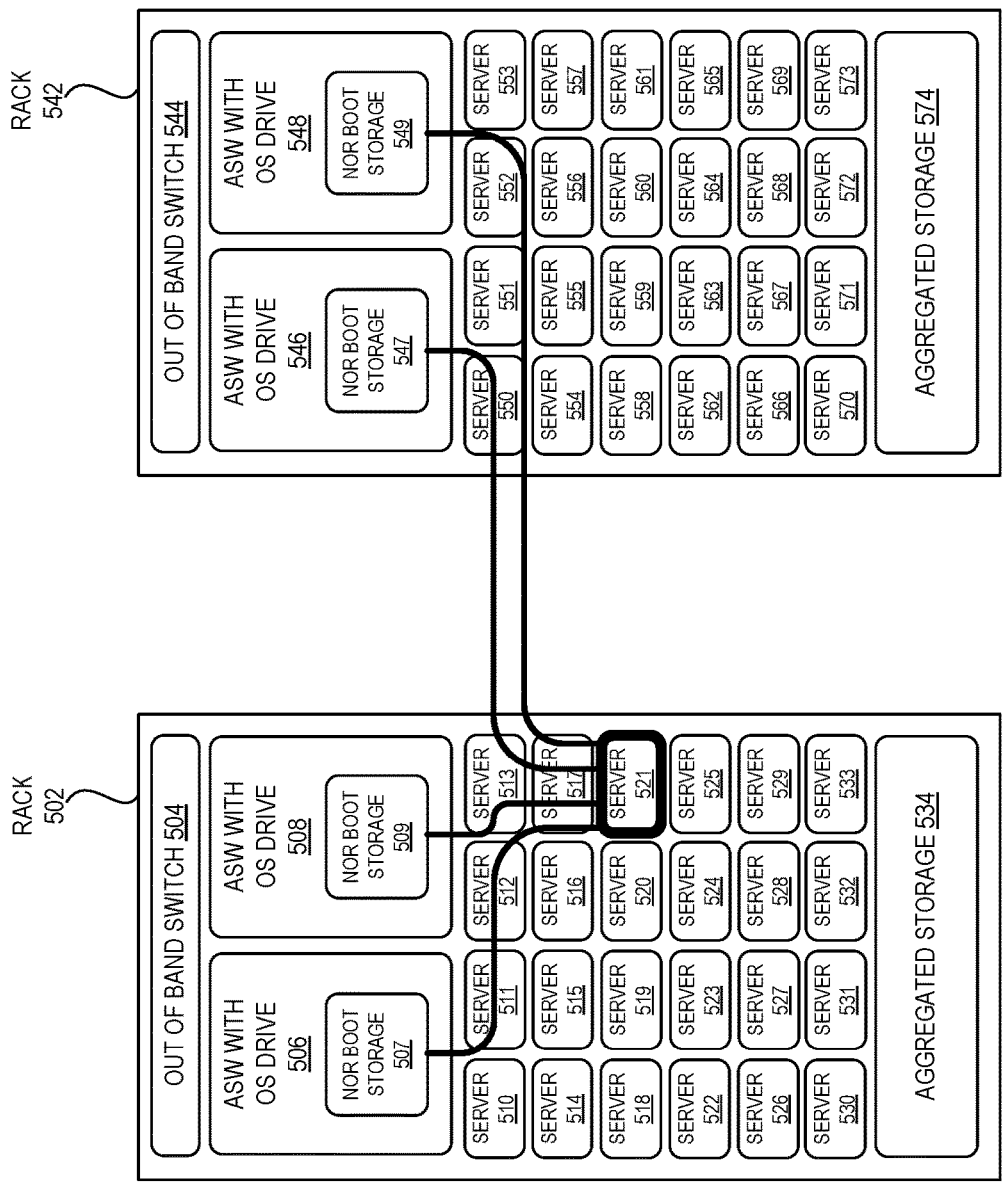
FIG. 5B illustrates an exemplary communication in two racks between a server and four switches of the two racks, where each switch includes the OS image, in accordance with an embodiment of the present application.

FIG. 5B illustrates an exemplary communication in two racks 502 and 542 between server 521 and four switches 506, 508, 546, and 548 of the two racks 502 and 542, where each switch includes the OS image, in accordance with an embodiment of the present application. Any two of ASWs 506, 508, 546, and 548 can be configured to act as the active device and the standby device, or vice versa. In some embodiments, the system can be configured to have more than two devices from which to obtain the OS image (e.g., as shown by the four thick lines indicating communications with NOR boot storages 507, 509, 547, and 549 of, respectively, ASWs 506, 508, 546, and 548).

Figure 5D:
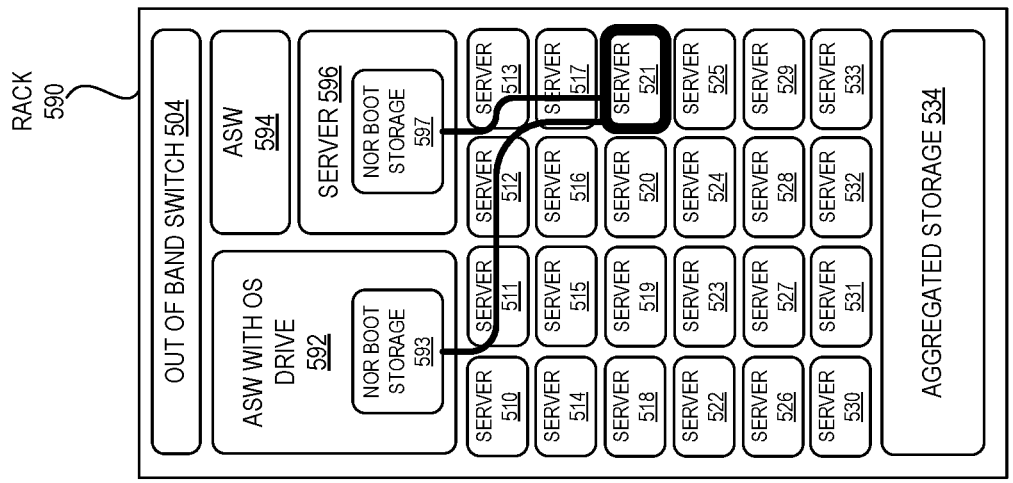
FIG. 5D illustrates an exemplary communication in a rack between a server, and a switch and a boot server, where the switch and the boot server each include the OS image, in accordance with an embodiment of the present application.
Figure 5C:
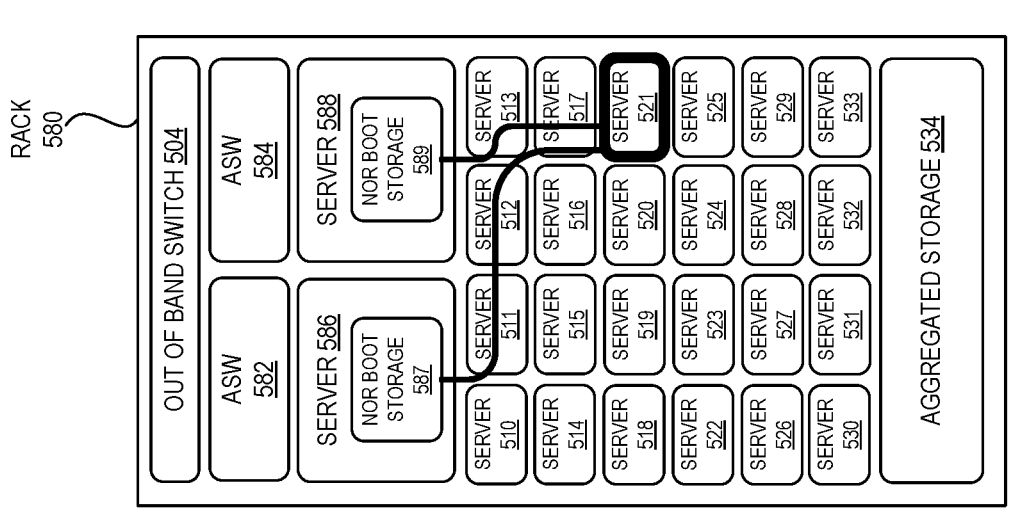
FIG. 5C illustrates an exemplary communication in a rack between a server and two servers which each include the OS image, in accordance with an embodiment of the present application.

FIG. 5C illustrates an exemplary communication in a rack between server 521 and two servers 586 and 588 which each include the OS image, in accordance with an embodiment of the present application. Servers 586 and 588 can be configured to act as the active device and the standby device, or vice versa. For example, server 521 can request the OS image from NOR boot storage 589 of server 588 (acting as the active device). If server 521 is unsuccessful in obtaining the OS image from server 588, server 521 can request the OS image from NOR boot storage 587 of server 586 (acting as the standby device).

FIG. 5D illustrates an exemplary communication in a rack between server 521, and a switch 592 and a boot server 596, where the switch and the boot server each include the OS image, in accordance with an embodiment of the present application. Boot server 596 and ASW 592 can be configured to act as the active device and the standby device, or vice versa. For example, server 521 can request the OS image from NOR boot storage 593 of ASW 592 (acting as the active device). If server 521 is unsuccessful in obtaining the OS image from ASW 592, server 521 can request the OS image from NOR boot storage 597 of boot server 596 (acting as the standby device).

Figure 9:
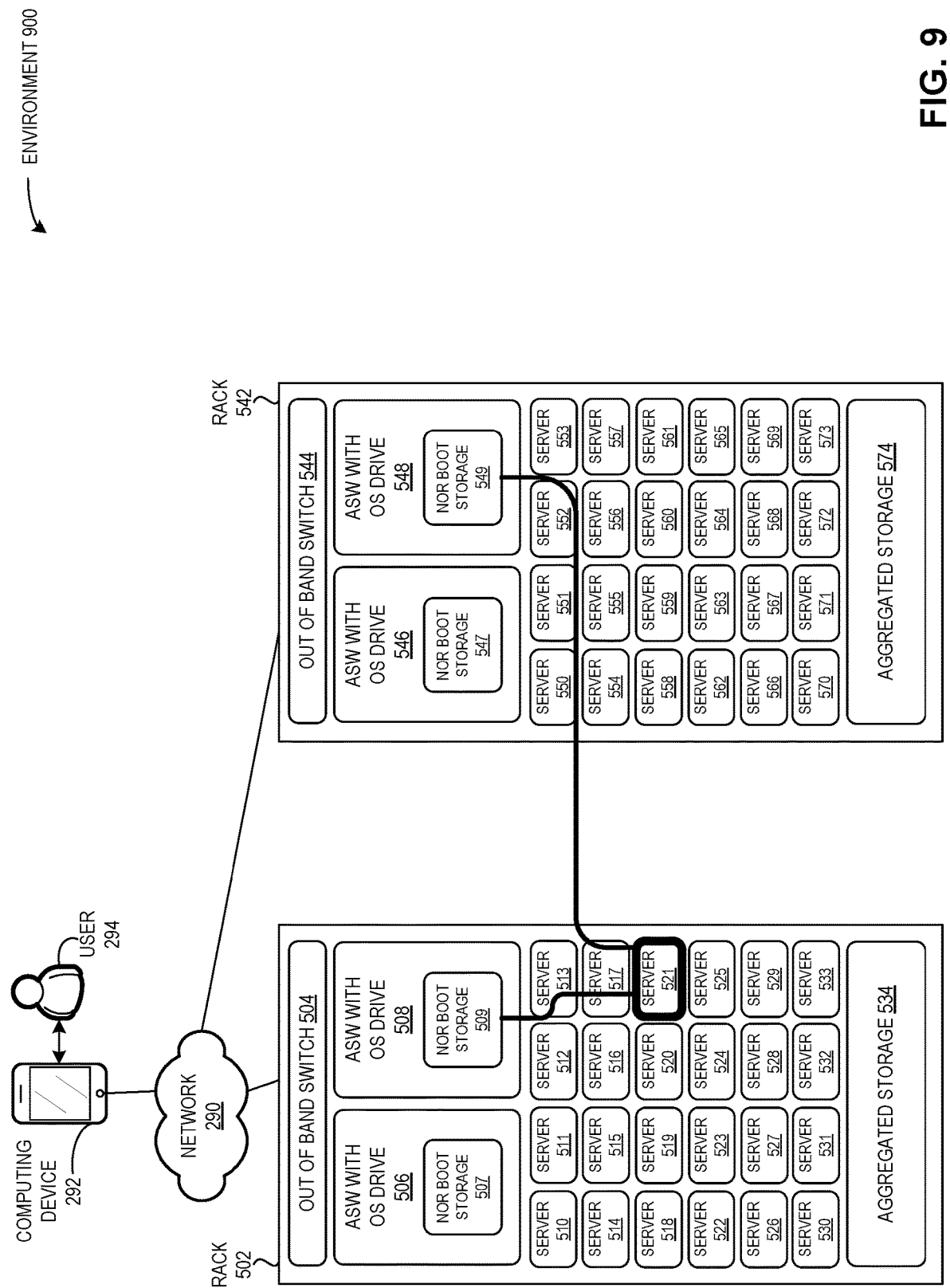
FIG. 9 illustrates an exemplary environment 900 that facilitates centralized boot storage, including an exemplary communication between two racks, in accordance with an embodiment of the present application.

Furthermore, as described above, the active device and the standby device can be a switch or a server in the same or a different rack as the requesting server. That is, an ASW switch with an OS image or a boot server may be accessed and shared among servers in multiple adjacent racks in a cluster. FIG. 9 illustrates an exemplary environment 900 that facilitates centralized boot storage, including an exemplary communication between two racks, in accordance with an embodiment of the present application. Environment 900 can include computing device 292 which is associated with user 294. Computing device 292 can communicate via network 290 with multiple racks (e.g., rack 502 and rack 542) in a storage system or cluster.

In environment 900, ASW 508 in rack 502 and ASW 548 in rack 542 can be configured to act as the active device and the standby device, or vice versa. For example, server 521 can request the OS image from NOR boot storage 509 of ASW 508 (acting as the active device). If server 521 is unsuccessful in obtaining the OS image from ASW 508, server 521 can request the OS image from NOR boot storage 549 of ASW 548 (acting as the standby device). Server 521 can communicate with ASW 508 and ASW 548 via an Ethernet protocol (e.g., a converged Ethernet protocol). While environment 900 depicts both the active and the standby device as a switch, note that the active and the standby device may be a switch or a server in the same or a different rack as the requesting server. Furthermore, the active and the standby device may be shared (i.e., accessed) between servers in multiple racks in a cluster.

Thus, the exemplary communications depicted in FIGS. 5A-5D and FIG. 9 demonstrate how a requesting server may obtain the OS image from a switch or a server in the same rack or a different rack as the requesting server.

Method for Facilitating Centralized Boot Storage by a First Switch

Figure 6:
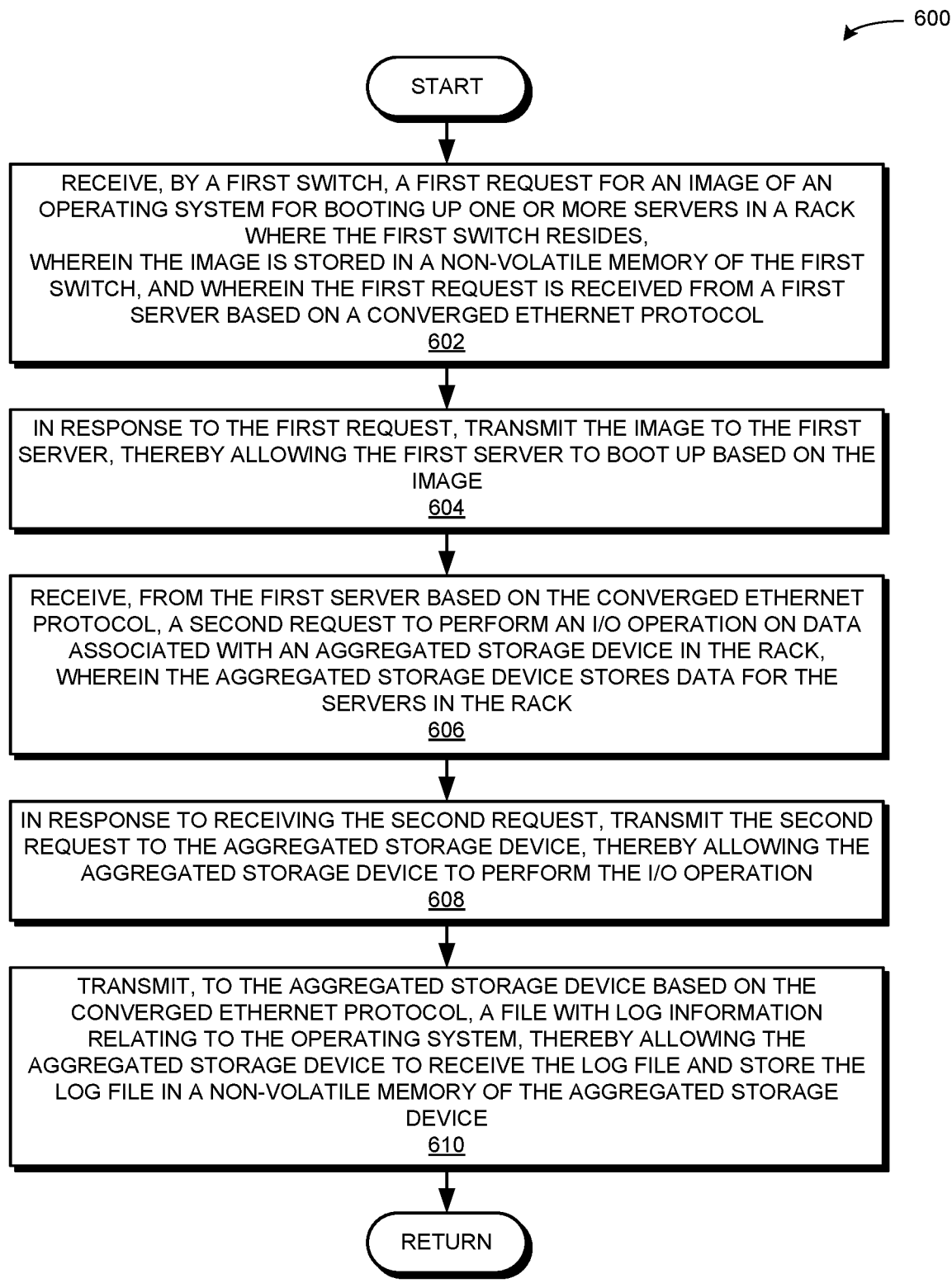
FIG. 6 presents a flowchart illustrating a method by a first switch for facilitating centralized boot storage, in accordance with an embodiment of the present application.

FIG. 6 presents a flowchart 600 illustrating a method by a first switch for facilitating centralized boot storage, in accordance with an embodiment of the present application. During operation, the system receives, by a first switch, a first request for an image of an operating system for booting up one or more servers in a rack where the first switch resides, wherein the image is stored in a non-volatile memory of the first switch, and wherein the first request is received from a first server based on a converged Ethernet protocol (operation 602). In response to the first request, the first switch transmits the image to the first server, thereby allowing the first server to boot up based on the image (operation 604). The system receives, from the first server based on the converged Ethernet protocol, a second request to perform an I/O operation on data associated with an aggregated storage device in the rack, wherein the aggregated storage device stores data for the servers in the rack (operation 606). In response to receiving the second request, the first switch transmits the second request to the aggregated storage device, thereby allowing the aggregated storage device to perform the I/O operation (operation 608). The first switch also transmits, to the aggregated storage device based on the converged Ethernet protocol, a file with log information relating to the operating system, thereby allowing the aggregated storage device to receive the log file and store the log file in a non-volatile memory of the aggregated storage device (operation 610). Note that operations 602/604, 606/608, and 610 do not necessarily occur in the order depicted in FIG. 6. That is, transmitting the boot image (operations 602/604), transmitting the I/O request (operations 606/608), and transmitting the log file (operation 610) may occur in any order.

Method for Facilitating Centralized Boot Storage by a First Server

Figure 7:
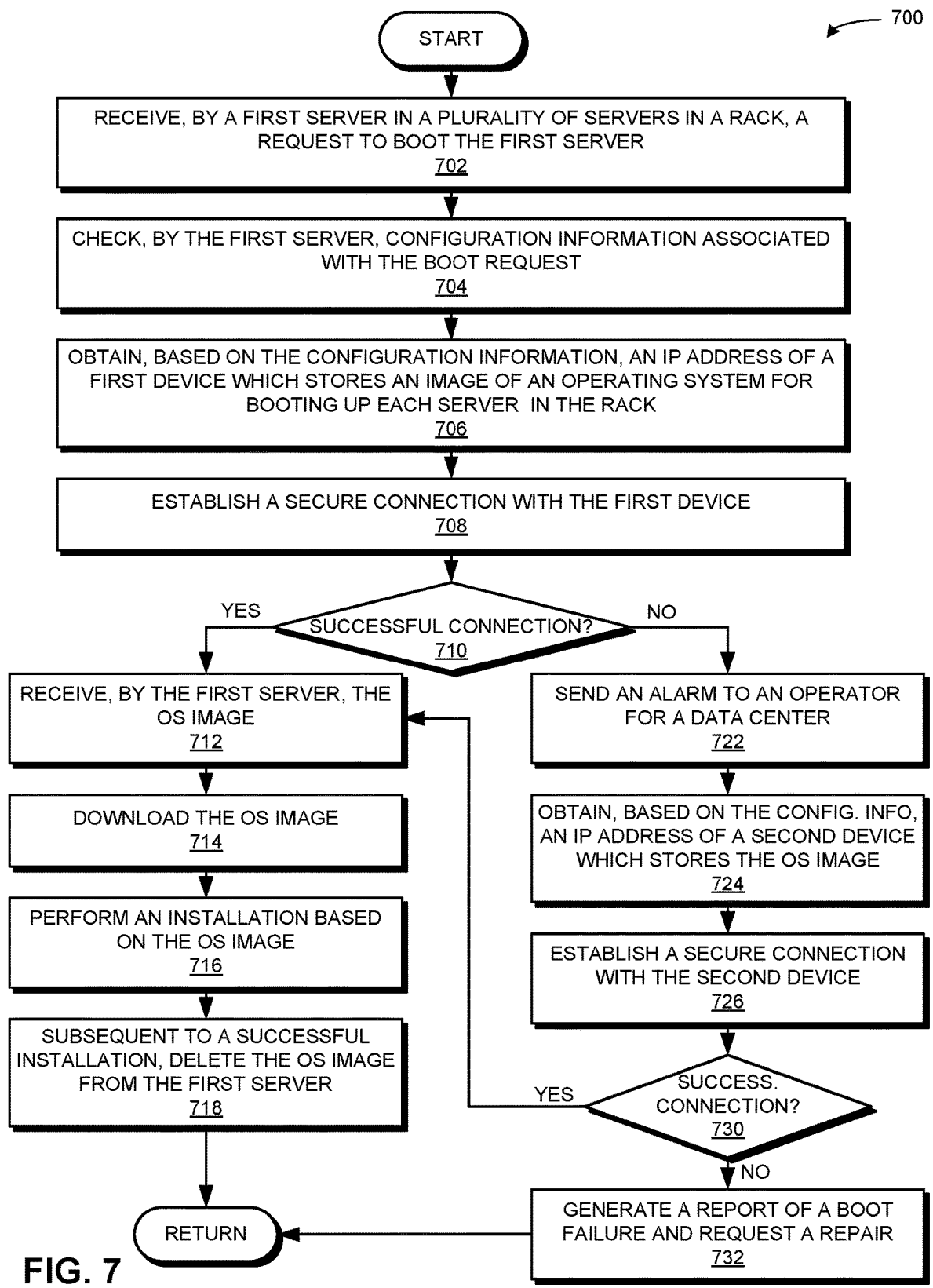
FIG. 7 presents a flowchart illustrating a method by a first server for facilitating centralized boot storage, in accordance with an embodiment of the present application.

FIG. 7 presents a flowchart 700 illustrating a method by a first server for facilitating centralized boot storage, in accordance with an embodiment of the present application. During operation, the system receives, by a first server in a plurality of servers in a rack, a request to boot the first server (operation 702). The first server checks configuration information associated with the boot request (operation 704). The configuration information can indicate a first device which is an active device and a second device which is a standby device (e.g., {<first_device>, <second_device>}). The first device and the second device can reside on a rack that is the same or different from the rack on which the first server resides. For example, the configuration information can indicate that {<first_device>, <second_device>} is one of the following: { ASW1 with OS image, ASW2 with OS image} (corresponding to FIGS. 5A and 5B); {Served with OS image, Server2 with OS image} (corresponding to FIG. 5C); and {ASW1 with OS image, Server 1 with OS image} (corresponding to FIG. 5D).

The first server obtains, based on the configuration information, an IP address of a first device which stores an image of an operating system for booting up each server in the rack (operation 706) (i.e., the active device). The OS image is used to boot up one or more servers in the rack. The first server establishes a secure connection with the first device (operation 708) based on the IP address. If the connection is successful (decision 710), the first server receives the OS image (operation 712) and downloads the OS image (operation 714). The first server performs an installation based on the OS image (operation 716), and, subsequent to a successful installation, deletes the OS image from the first server (operation 718).

If the connection is not successful (decision 710), the first server sends an alarm to an operator for a data center with which the first device is associated (operation 722). The first server can also generate a message or notification based on a configuration of the system, which allows an operator of a data center associated with the first device to investigate the unsuccessful connection with the first device (or perform another system-specific action). The first server obtains, based on the configuration information, an IP address of a second device which stores the OS image (operation 724) (i.e., the standby device). The first server establishes a secure connection with the second device (operation 726). If the connection is successful (decision 730), the operation continues as described above at operation 712. If the connection is not successful (decision 730), the first server generates a report of a boot failure and requests a repair (operation 732). The first server can also perform other operations based on the system configuration, such as recording the failure to a log file or sending a notification to the aggregated boot storage. The data center operator can receive the boot failure report and the repair request, and can subsequently investigate the unsuccessful connection with the second device.

Exemplary Computer System

Figure 8:
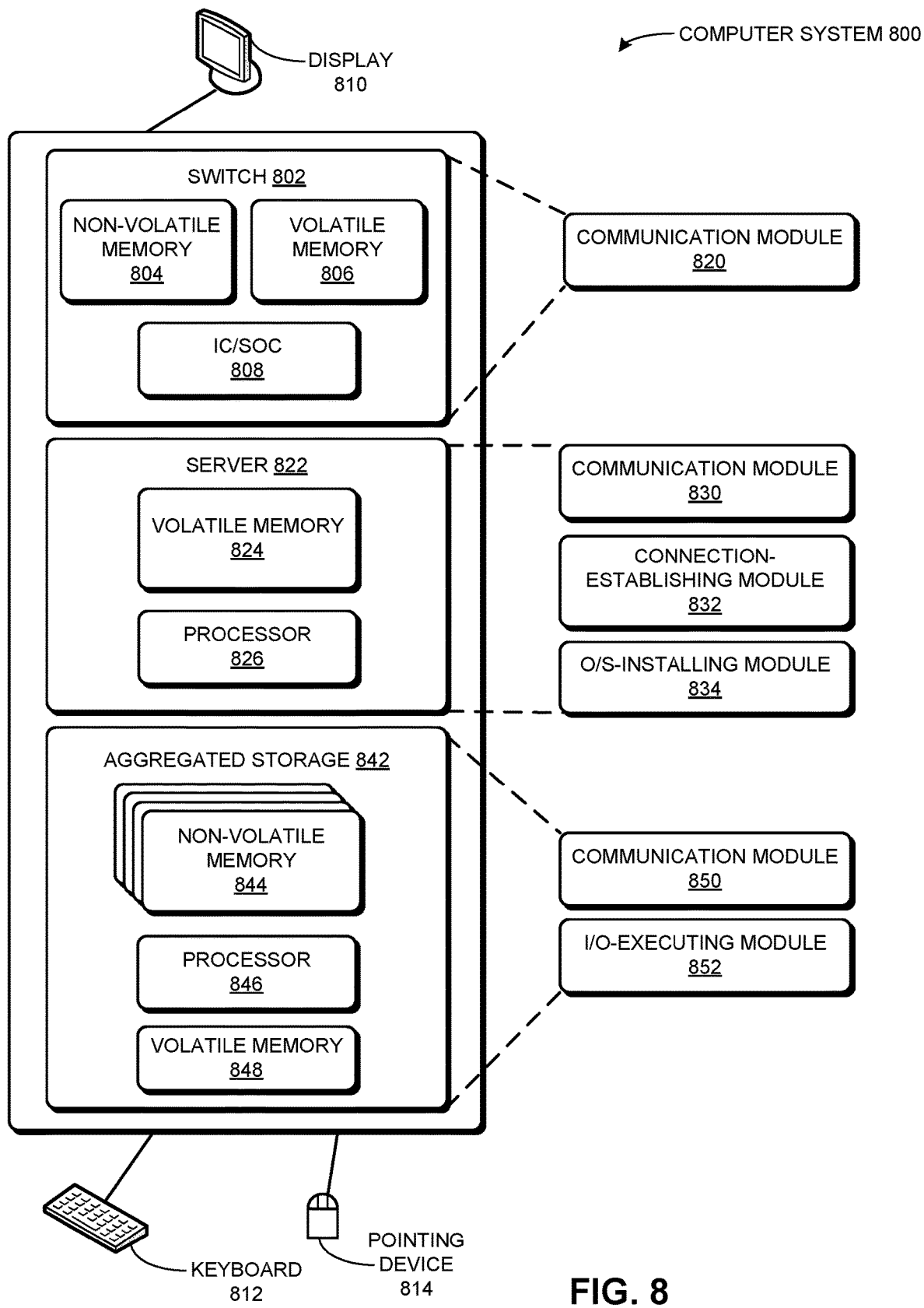
FIG. 8 illustrates an exemplary computer system that facilitates centralized boot storage, in accordance with an embodiment of the present application.

FIG. 8 illustrates an exemplary computer system that facilitates centralized boot storage, in accordance with an embodiment of the present application. Computer system 800 can include a switch 802, a server 822, and an aggregated storage 842 (corresponding, respectively, to ASW 208, server 217, and aggregated storage 250 in rack 202 of FIG. 2). Computer system 800 can be coupled to a display device 810, a keyboard 812, and a pointing device 814.

Switch 802 can include a non-volatile memory 804, a volatile memory 806, and an integrated circuit (IC)/SOC 808. Non-volatile memory 804 can be, e.g., a NOR flash memory, which can be configured to store an image of an operating system for booting up one or more servers in a rack where switch 802 resides. Non-volatile memory 804 can also be configured to store a duplicate image of the operating system. Volatile memory 806 can be memory, e.g., RAM, that serves as a managed memory, and can be used to store one or more memory pools. Switch 802 can include instructions which when executed by computer system 800, can cause computer system 800 to perform methods and/or processes described in this disclosure. Specifically, switch 802 can include instructions for receiving a first request from a first server (e.g., server 822) for the image for booting up one or more servers in a rack in which switch 802 resides (communication module 820). Switch 802 can also include instructions for, in response to the first request, transmitting the image to the first server (communication module 820).

Switch 802 can also include instructions for receiving from the first server a second request to perform an I/O operation on data associated with an aggregated storage device (e.g., aggregated storage 842) (communication module 820). Switch 802 can include instructions for, in response to receiving the second request, transmitting the second request to the aggregated storage device (communication module 820). Switch 802 can further include instructions for transmitting, to the aggregated storage device, a file with log information relating to the OS (communication module 820).

Server 822 can include a volatile memory 824 and a processor 826. Server 822 can also include instructions, which when executed by computer system 800, can cause computer system 800 to perform methods and/or processes described in this disclosure. Specifically, server 822 can include instructions for receiving a request to boot up the first server (communication module 830). Server 822 can include instructions for obtaining an IP address of a first device which stores an OS image for booting up one or more servers in a rack where server 822 resides (communication module 830). Server 822 can include instructions for, in response to successfully establishing a secure connection with the first device (connection-establishing module 832), performing an installation based on the OS image (0/S-installing module 834).

Server 822 can also include instructions for, in response to unsuccessfully establishing a secure connection with the first device (connection-establishing module 832): generating a message indicating an unsuccessful connection with the first device (communication module 830); obtaining, based on the configuration information, an IP address of a second device which stores the image (communication module 830); in response to successfully establishing a secure connection with the second device and receiving the image (connection-establishing module 832 and communication module 830), performing an installation based on the image (0/S-installing module 834); and in response to unsuccessfully establishing a secure connection with the second device (connection-establishing module 832), generating a message indicating an unsuccessful connection with the second device (communication module 830).

Aggregated storage 842 can include non-volatile memory 844, a processor 846, and a volatile memory 848. Aggregated storage 842 can include instructions for receiving a request to perform an I/O operation (communication module 850), and for performing the I/O operation (I/O-executing module 852).

Aggregated storage 842 can also include instructions for receiving a log file (communication module 850), and storing the log file in a non-volatile memory of aggregated storage 842 (e.g., non-volatile memory 844) (I/O-executing module 852).

Computer system 800 can also store any data that is required as input or that is generated as output by the methods and/or processes described in this disclosure. The data can be stored in one or more of the non-volatile or volatile memory of computer system 800 (e.g., 804, 806, 824, 844, and 848), and can include at least the following data: an image; an image of an operating system; a duplicate image; a request; a request for the image; configuration information; an indication of an active or a standby device; an IP address; a protocol; information to communicate based on a converged Ethernet protocol; a request to perform an I/O operation; data associated with an I/O operation; an indicator of components such as a network interface card, a storage drive, a volatile memory, a non-volatile memory, a processor, and an IC/SOC; a file; log information relating to an operating system; a file with the log information; a request to boot up a server; an indicator of whether a secure connection has been successfully established between a server and another device; and a message indicating an unsuccessful connection with an active or a standby device.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A first switch, comprising:
a non-volatile memory configured to store an image of an operating system for booting up a plurality of servers in a rack; and
a communication module configured to:
  receive a first request for the image from a first server based on a communication protocol and further based on an IP address of the first switch;
  in response to the first request and in response to successfully establishing a secure connection between the first server and the first switch based on the IP address of the first switch:
    transmit the image to the first server, which causes the first server to boot up based on the image;
    subsequent to the first server booting up based on the transmitted image, receive, from the first server based on the communication protocol, a second request to perform an I/O operation on data associated with an aggregated storage device residing in the same rack as the plurality of servers, wherein the aggregated storage device stores data for the plurality of servers in the rack; and
    in response to receiving the second request, transmit the second request to the aggregated storage device, which causes the aggregated storage device to perform the I/O operation; and
  in response to the first request and in response to unsuccessfully establishing a secure connection between the first server and the first switch:
    generating a message indicating an unsuccessful connection with the first switch, thereby allowing an operator of a data center associated with the first switch to investigate the unsuccessful connection with the first switch;
    in response to successfully establishing a secure connection between the first server and a second device based on an IP address of the second device, wherein the second device is a switch or a server which resides in the rack or another rack, causing the first server to boot up based on an image of the operating system received from the second device; and in response to unsuccessfully establishing a secure connection between the first server and the second device, generating a message indicating an unsuccessful connection with the second device, thereby allowing the operator to investigate the unsuccessful connection with the second device.

2. The first switch of claim 1, wherein a respective server in the rack does not store the image and does not include any non-volatile memory.

3. The first switch of claim 1, wherein the non-volatile memory is one or more of:
a byte-addressable memory; and
a NOR flash memory.

4. The first switch of claim 1, wherein the first switch is an active switch,
wherein responsive to the communication module of the first switch failing to transmit the image to the first server, the first request is sent to a communication module of a standby device for the first switch,
wherein the standby device comprises a non-volatile memory configured to store the image, and
wherein the communication module of the standby device is configured to receive the first request and transmit the image to the first server.

5. The first switch of claim 4, wherein the standby device is a second switch or a second server in the rack or in another rack.

6. The first switch of claim 1, wherein the non-volatile memory is further configured to store a duplicate image of the operating system, and
wherein the duplicate image is used to provide high availability for the rack.

7. The first switch of claim 1, wherein the communication protocol comprises a converged Ethernet protocol.

8. The first switch of claim 7, wherein the aggregated storage device comprises:
a plurality of high-speed network interface cards which communicate with the first switch based on the converged Ethernet protocol;
a plurality of storage drives with non-volatile memory; and
a central processing unit which communicates with the storage drives based on a peripheral component interconnect express protocol.

9. The first switch of claim 7, wherein the communication module is further configured to:
transmit, to the aggregated storage device based on the converged Ethernet protocol, a file with log information relating to the operating system; and
wherein the aggregated storage device further comprises a communication module configured to:
receive the log file; and
store the log file in a non-volatile memory of the aggregated storage device.

10. A computer-implemented method for facilitating centralized boot storage, wherein the method comprises:
receiving, by a first switch based on a communication protocol, a first request for an image of an operating system for booting up one or more servers in a rack, wherein the image is stored in a non-volatile memory of the first switch, and wherein the first request is received from a first server based on an IP address of the first switch;

in response to the first request and in response to successfully establishing a secure connection between the first server and the first switch based on the IP address of the first switch:
transmitting the image to the first server, which causes the first server to boot up based on the image;
subsequent to the first server booting up based on the transmitted image, receiving, from the first server based on the communication protocol, a second request to perform an I/O operation on data associated with an aggregated storage device residing in the same rack as the plurality of servers,
wherein the aggregated storage device stores data for the plurality of servers in the rack; and
in response to receiving the second request, transmitting the second request to the aggregated storage device, which causes the aggregated storage device to perform the I/O operation; and in response to the first request and in response to unsuccessfully establishing a secure connection between the first server and the first switch:
generating a message indicating an unsuccessful connection with the first switch, thereby allowing an operator of a data center associated with the first switch to investigate the unsuccessful connection with the first switch;
in response to successfully establishing a secure connection between the first server and a second device based on an IP address of the second device, wherein the second device is a switch or a server which resides in the rack or another rack, causing the first server to boot up based on an image of the operating system received from the second device; and
in response to unsuccessfully establishing a secure connection between the first server and the second device, generating a message indicating an unsuccessful connection with the second device, thereby allowing the operator to investigate the unsuccessful connection with the second device.

11. The method of claim 10, wherein a respective server in the rack does not store the image and does not include any non-volatile memory.

12. The method of claim 10, wherein the non-volatile memory is one or more of:
a byte-addressable memory; and
a NOR flash memory.

13. The method of claim 10, wherein the first switch is an active switch,
wherein responsive to the first switch failing to transmit the image to the first server, the first request is sent to a standby device for the first switch,
wherein the image is stored in a non-volatile memory of the standby device, and
wherein the standby device receives the first request and transmits the image to the first server.

14. The method of claim 13, wherein the standby device is a second switch or a second server in the rack or in another rack.

15. The method of claim 10, wherein a duplicate image of the operating system is stored in the non-volatile memory, and
wherein the duplicate image is used to provide high availability for the rack.

16. The method of claim 10, wherein the communication protocol comprises a converged Ethernet protocol.

17. The method of claim 16, wherein the aggregated storage device comprises:

a plurality of high-speed network interface cards which communicate with the first switch based on the converged Ethernet protocol;
a plurality of storage drives with non-volatile memory; and
a central processing unit which communicates with the storage drives based on a peripheral component interconnect express protocol.

18. The method of claim 16, further comprising:
transmitting, to the aggregated storage device based on the converged Ethernet protocol, a file with log information relating to the operating system; and
thereby allowing the aggregated storage device to:
  receive the log file; and
    store the log file in a non-volatile memory of the aggregated storage device.

19. A computer-implemented method for facilitating centralized boot storage, wherein the method comprises:
receiving, by a first server of a plurality of servers in a rack, a first request to boot up the first server;
obtaining, by the first server based on configuration information associated with the boot request, an IP address of a first device which stores an image of an operating system for booting up the servers in the rack, wherein the first device is a switch which resides in the rack or another rack;
in response to successfully establishing a secure connection with the first device based on the IP address of the first device and receiving the image from the first device as a transmitted image:
  performing, by the first server, an installation based on the transmitted image;
  subsequent to the first server performing the installation based on the transmitted image, transmitting, by the first server to the first device, a second request to perform an I/O operation on data associated with an aggregated storage device residing in the same rack as the plurality of servers,
  wherein the aggregated storage device stores data for the plurality of servers in the rack; and
  in response to the first device receiving the second request, transmitting the second request to the aggregated storage device, which causes the aggregated storage device to perform the I/O operation; and
in response to unsuccessfully establishing a secure connection with the first device:
  generating a message indicating an unsuccessful connection with the first device, thereby allowing an operator of a data center associated with the first device to investigate the unsuccessful connection with the first device;
  obtaining, based on the configuration information, an IP address of a second device which stores the image, wherein the second device is a switch or a server which resides in the rack or another rack;
  in response to successfully establishing a secure connection with the second device and receiving the image, performing, by the first server, an installation based on the image; and
  in response to unsuccessfully establishing a secure connection with the second device, generating a message indicating an unsuccessful connection with the second device, thereby allowing the operator to investigate the unsuccessful connection with the second device.

20. The method of claim 19,
wherein generating the message indicating the unsuccessful connection with the first device allows an operator of a data center associated with the first device to investigate the unsuccessful connection with the first device; and
wherein generating the message indicating the unsuccessful connection with the second device allows the operator to investigate the unsuccessful connection with the second device.

* * * * *